(12) United States Patent
French

(10) Patent No.: US 7,063,491 B2
(45) Date of Patent: Jun. 20, 2006

(54) REVERSE BARB SYSTEM FOR SCREWS AND NAILS

(76) Inventor: Douglas R. French, P.O. Box 27165, Houston, TX (US) 77227

( * ) Notice: Subject to any disclaimer, the term of this patent is extended or adjusted under 35 U.S.C. 154(b) by 186 days.

(21) Appl. No.: 10/795,289

(22) Filed: Mar. 9, 2004

(65) Prior Publication Data

US 2004/0253076 A1    Dec. 16, 2004

Related U.S. Application Data

(60) Provisional application No. 60/477,479, filed on Jun. 11, 2003.

(51) Int. Cl.
*F16B 25/10* (2006.01)
*F16B 35/04* (2006.01)

(52) U.S. Cl. .................. 411/387.8; 411/387.5; 411/387.1; 411/387.3; 411/417

(58) Field of Classification Search .. 411/387.1–387.8, 411/411, 417, 418; 606/73
See application file for complete search history.

(56) References Cited

U.S. PATENT DOCUMENTS

| | | | | |
|---|---|---|---|---|
| 1,088,892 A * | 3/1914 | Foreman | ...................... | 411/418 |
| 1,465,148 A * | 8/1923 | Rosenberg | .................. | 411/418 |
| 1,933,332 A * | 10/1933 | May | ............................ | 411/418 |
| 3,083,609 A * | 4/1963 | Lovisek | ....................... | 411/386 |
| 3,362,281 A * | 1/1968 | Finlay | ........................ | 411/395 |
| 3,911,781 A * | 10/1975 | Bappert | ...................... | 411/418 |
| 3,969,975 A | 7/1976 | Krol | | |
| 4,161,132 A * | 7/1979 | Eklund et al. | .............. | 411/417 |
| 4,259,889 A * | 4/1981 | Capuano | ..................... | 411/417 |
| 4,537,185 A * | 8/1985 | Stednitz | ....................... | 606/73 |
| 4,815,909 A * | 3/1989 | Simons | ...................... | 411/392 |
| 4,973,210 A * | 11/1990 | Osborne et al. | ............ | 411/389 |
| 4,973,211 A | 11/1990 | Potucek | | |
| 5,230,597 A | 7/1993 | Nutall | | |
| 5,253,965 A | 10/1993 | Angel | | |
| 5,557,898 A | 9/1996 | Dixon | | |
| 5,865,584 A * | 2/1999 | Onofrio | ...................... | 411/411 |
| 6,022,177 A * | 2/2000 | Hofer | ......................... | 411/412 |
| 6,086,303 A * | 7/2000 | Fluckiger | .................... | 411/399 |
| 6,676,352 B1 * | 1/2004 | Chen-Chi et al. | .......... | 411/417 |

* cited by examiner

*Primary Examiner*—Katherine Mitchell
(74) *Attorney, Agent, or Firm*—Richard C. Litman

(57) ABSTRACT

The reverse barb system for screws and nails includes fasteners that are barbed to prevent backing out once driven into a workpiece or construction material, such as wood. A screw with barbed threads has several barbed thread sections. Each barbed thread section is a section of thread having a leading edge and a trailing edge, the trailing edge defining a barb to increase the screw's resistance to backing out once driven into place. A nail with a barbed point is a nail having one or more barbs formed in the nail's point. Each barb is defined by a leading edge and a trailing edge. The barb's trailing edge forms an acute angle with the longitudinal axis of the nail. The barbs extend from the nail shank to prevent the nail from backing out.

6 Claims, 6 Drawing Sheets

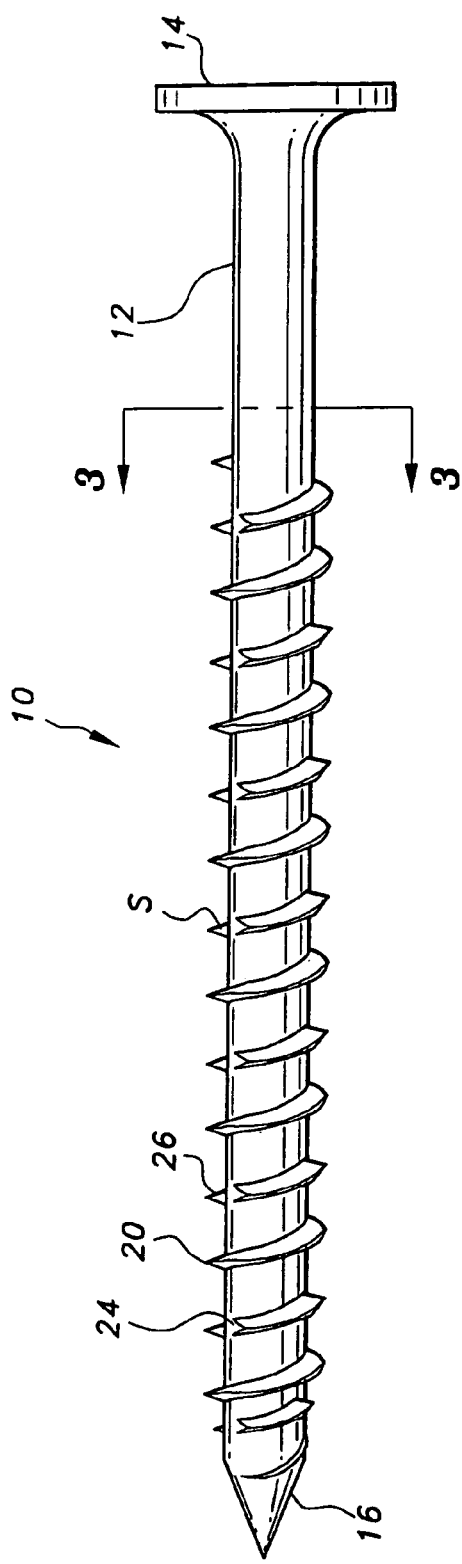
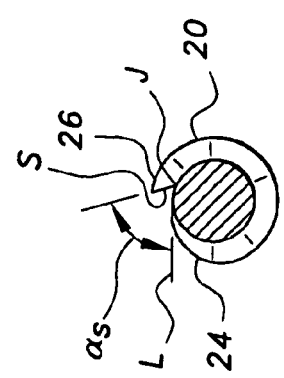
Fig. 2
Fig. 3

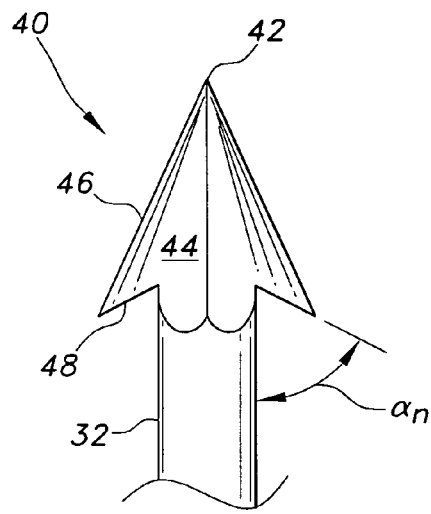 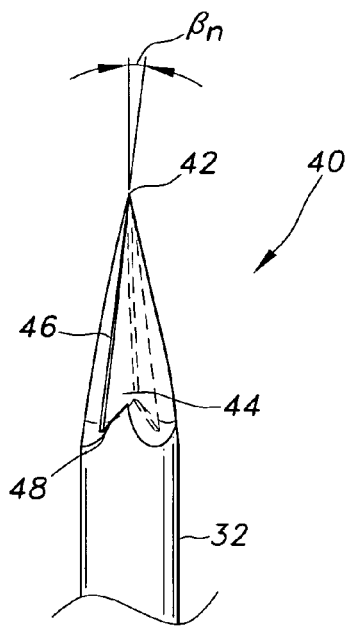
Fig. 8                    Fig. 9
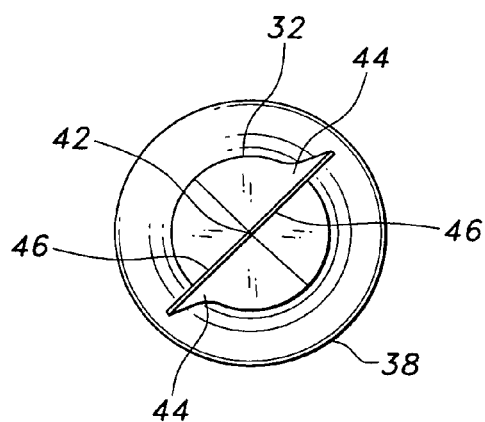
Fig. 10

REVERSE BARB SYSTEM FOR SCREWS AND NAILS

CROSS-REFERENCE TO RELATED APPLICATION

This application claims the benefit of U.S. Provisional Patent Application Ser. No. 60/477,479, filed Jun. 11, 2003.

BACKGROUND OF THE INVENTION

1. Field of the Invention

The present invention relates to nail and screw type fasteners. More specifically, the invention is a reverse barb system for screws and nails that provides screws and nails with a resistance to backing out or popping out from a workpiece.

2. Description of the Related Art

A problem exists in construction wherein the fasteners used in wood frame construction, particularly screws and nails, tend to come loose over time. Subjected to weight, expansion and contraction of materials due to changing temperature and humidity, vibration, the force of storms, and other stresses, the screws and nails used to join wood and other materials in construction have a tendency to back out. Nails simply work back out as if pulled out, while screws tend to turn out over time, their threads following the thread path of entry. As the screws and nails back out, the joints that they fasten become loose, leaving structures weak and vulnerable to further damage, or even collapse. Nothing is more common than to see nail or screw heads popping out from drywall as the fasteners used to secure drywall to wood studs loosen over time.

The lifespan and structural integrity of a structure held together by screws and nails can be improved by the use of screws and nails that resist the tendency to back out. A few previous fasteners have been fashioned with features provided to resist the tendency of the fastener to back out.

U.S. Pat. No. 4,973,211, issued on Nov. 27, 1990 to F. Potucek, discloses a star-shaped fastener that is essentially a nail having at least three fins radiating from a central shaft. The fins run the length of the nail, and provide additional surface area while using less material for their construction. The increased surface area provides additional friction and tends to increase the fastener's resistance to backing out. Additionally, an embodiment of the star fastener includes several small barbs disposed along the shaft in between the fins. The barbs are intended to increase the back-out resistance of the fastener. However, the barbs are quite small relative to the cross section of the fastener. Additionally, the barbs are in-line with one another. Since the fastener has no tendency to turn as it is driven into place, the barbs may withdraw through the channel that they cut into the wood as the fastener is driven. Although wood fibers will tend to return to their original position after the fastener is driven into place, they are not likely to fully close in behind the barbs. The effectiveness of the barbs to reduce back-out is thus decreased.

U.S. Pat. No. 3,969,975, issued on Jul. 20, 1976 to H. Krol, discloses a heavy-duty staple that has a series of anchoring notches along the prongs of the staple. The anchoring notches function essentially as barbs, tending to hold the staple from backing out. Again, however, the barbs cannot have their full gripping effect when they will back out along the same path through which they were inserted.

U.S. Pat. No. 5,230,597, issued on Jul. 27, 1993 to J. Nuttall, discloses a fastener comprising an elongated shank that is provided with at least one wedge-shaped protrusion along the shank. This wedge functions as a barb, allowing the fastener to be freely driven into place but tending to prevent the fastener from backing out. Unlike the barbs of the previously discussed fasteners, however, the wedge is angled so that the fastener turns slightly as it is driven. The result of this turning action is that the wedge provides greater resistance to back-out along a straight path. This fastener, however, lacks a sharp point. Not a general purpose fastener or nail, the fastener is intended for insertion into a predrilled hole. The wedge is welded along the fastener's shank. This method of manufacture of the fastener is not suitable for nails, which are typically formed by a cold-forge process.

U.S. Pat. No. 5,557,898, issued to T. Dixon on Sep. 24, 1996, discloses a barbed finish nail having a plurality of flexible barbs along its shank. The barbed finish nail is used to fasten trim pieces to a wall construction of wallboard and metal studs. Metal studs are typically formed of sheet metal, formed to roughly the contour and dimensions of a two-by-four stud. The flexible barbs of the barbed finish nail are designed to expand as the nail is driven through, and then exits, the sheet metal material of the metal stud. The expanded barbs catch against the inner surface of the metal stud to resist withdrawal. While effective for its purpose of fastening trim pieces to a wall construction of wallboard and metal studs, the flexible barbs of the barbed finish nail are not useful as a general-purpose construction nail.

U.S. Pat. No. 5,253,965, issued on Oct. 19, 1993 to J. Angel, discloses a barbed fastener for joining two or more plastic or metal panels. The fastener has large barbed fins extending along the fastener's shank. This specialized fastener includes an adhesive, contained in a groove formed along the fastener shank, to help to hold the fastener in place.

None of the above inventions and patents, taken either singly or in combination, is seen to describe the instant invention as claimed. Thus a reverse barb system for screws and nails solving the aforementioned problems is desired.

SUMMARY OF THE INVENTION

The reverse barb system for screws and nails provides screw and nail type fasteners with barbs formed to prevent backing out of the fastener. A screw with barbed threads has several barbed thread sections. Each barbed thread section has a leading edge and a trailing edge, the trailing edge defining a barb to increase the screw's resistance to backing out once driven into place. The barbed thread is applicable to numerous threaded fasteners, including screws, lag bolts, rail bolts, threaded hooks, threaded eye bolts, and other applications. A nail point features barbs extending back from the point of the nail. The barbs are angled slightly, relative to the longitudinal axis of the nail, so that the nail turns slightly as it is driven. The barbed nail point is formed in a shape that may be manufactured by known processes that employ a die to form the nail point.

Accordingly, it is a principal object of the invention to provide a reverse barb system for screws and nails to improve the resistance of screw and nail type fasteners to backing out.

It is another object of the invention to provide a reverse barb system for screws that increases the screw's resistance to turning out.

It is a further object of the invention to provide a reverse barb system for nails that increases the nail's resistance to backing out.

Still another object of the invention is to provide a reverse barb system for nails that causes the nail to turn slightly as it is driven.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a side elevational view of the screw with barbed threads of FIG. 1 according to the present invention.

FIG. 3 is a section view drawn along lines 3—3 of FIG. 2.

FIG. 8 is a front elevational view of the barbed point of the nail with a barbed point according to the present invention.

FIG. 9 is a side elevational view of the barbed point of the nail with a barbed point according to the present invention.

FIG. 10 is an end view of the barbed point of the nail with a barbed point according to the present invention.

Similar reference characters denote corresponding features consistently throughout the attached drawings.

DETAILED DESCRIPTION OF THE PREFERRED EMBODIMENTS

Figure 1:
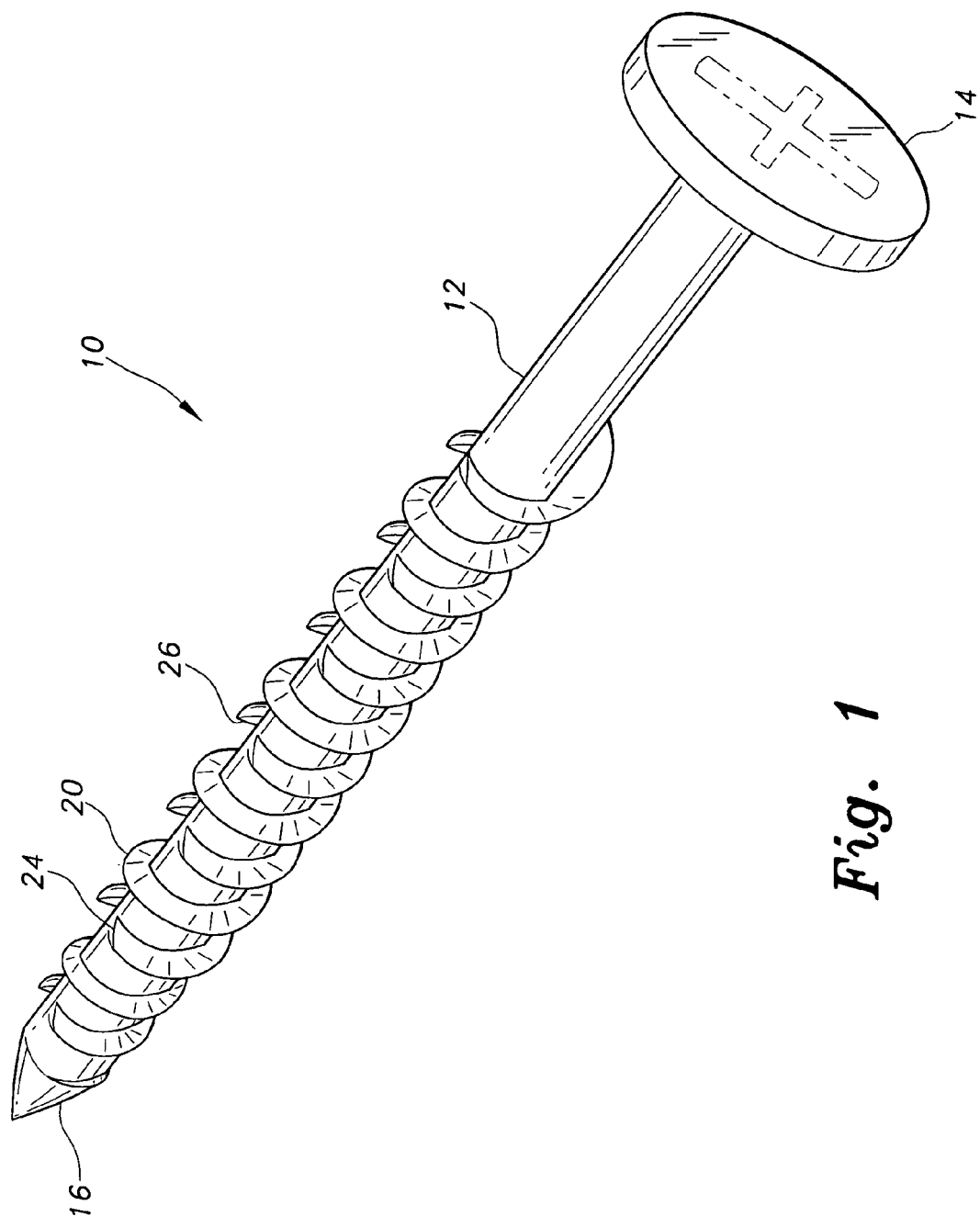
FIG. 1 is a perspective view of a screw with barbed threads as an embodiment of the reverse barb system for screws and nails according to the present invention.

The present invention is a reverse barb system for screws and nails. Barbed fasteners according to the invention resist backing out once driven into a work piece or construction material such as wood. The reverse barb system for screws and nails includes a screw with barbed threads, designated generally as 10 in the drawings and shown particularly in FIGS. 1–3, and a nail with a barbed point designated generally as 30 and shown particularly in FIGS. 7–10.

Turning to FIG. 1, the screw with barbed threads 10 is a screw generally in the form of conventional screws, having an elongated shank 12 with a head end 14 and a point end 16. A thread is formed on the outer periphery of the shank 12. However, rather than a conventional continuous thread, the thread is composed of several barbed thread sections 20. Each barbed thread section 20 is a section of thread having a leading edge 24 and a trailing edge 26. As shown in the figures, each barbed thread section 20 extends 720° around the shank, placing barb trailing edges 26 at 720° intervals. It can be appreciated by those skilled in the art that the length of the barbed thread sections 20 and the spacing of the barb trailing edges 26 can be greatly varied. For example, the barb trailing edges 26 can be formed every 180°, every 360°, or at other intervals. FIG. 2 shows the last of the barbed thread sections 20 near the head end 14 spanning 360°.

FIG. 3 illustrates the general shape of the leading edges 24 and the trailing edges 26 of the barbed thread sections 20. The trailing edge 26 is an abrupt termination of a barbed thread section 20 defining a surface S which extends from the shank at a joinder segment J (see FIGS. 4 and 5). The surface S and a line L, that is tangent to the shank 12 and extends normally from the joinder segment J, form an angle $\alpha_s$ therebetween. Angle $\alpha_s$ is an acute angle of less than 90°. The angle should be greater than about 50°, and is preferably within a range of approximately 55° to 70°. An angle of approximately 60° appears to provide the maximum resistance to backing out of the screw with barbed threads 10.

Trailing edges 26 are formed with sharp edges so they will tend to resist backing out of the screw with barbed threads 10. The leading edge 24 gradually tapers from the maximum thread width to the shank 12. The leading edge 24 ends generally tangent to the shank 12. Leading edges 24 are formed with dull, rounded edges so that the ease of driving the screw is not compromised.

Figure 4:
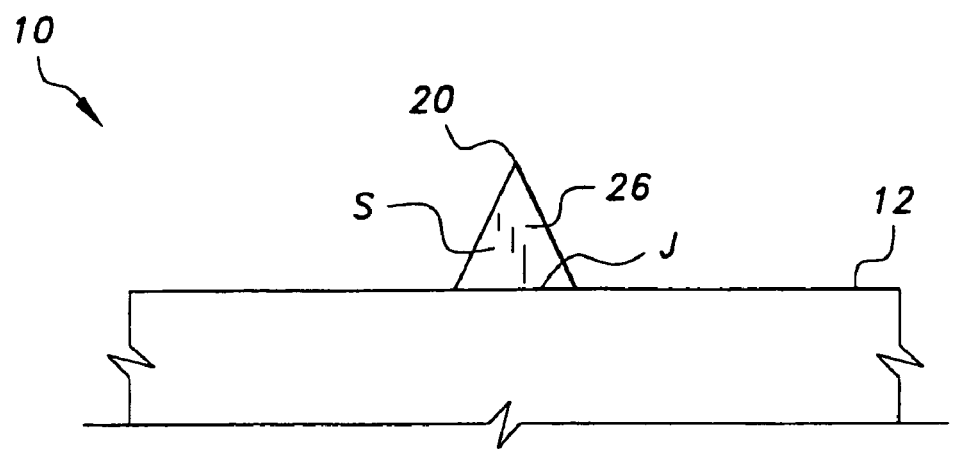
FIG. 4 is a diagrammatic side view showing a vertically oriented barbed thread.
Figure 5:
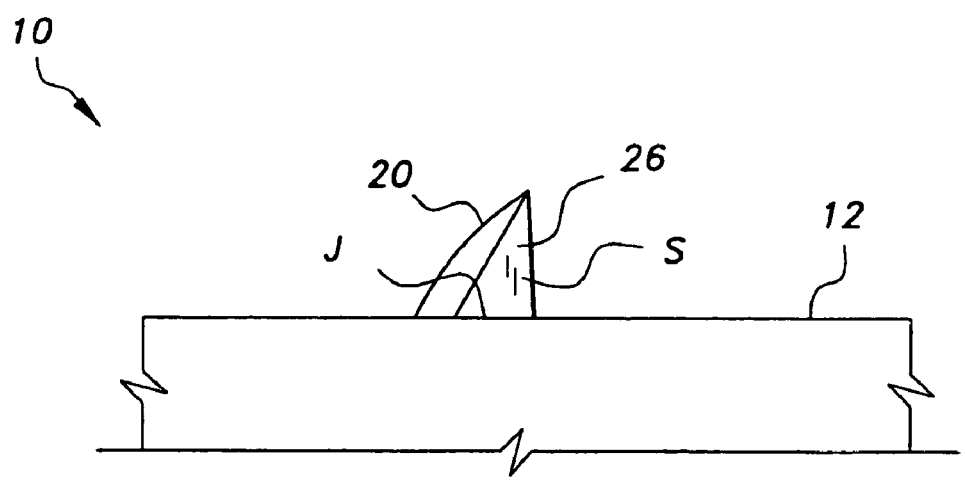
FIG. 5 is a diagrammatic side view showing a barbed thread bent slightly to one side.

Turning now to FIGS. 4 and 5, the trailing edge 26 of each barbed thread section 20 may be formed in line with the barbed thread section 20, presenting a "straight" barb face as seen in FIG. 4, or may be "bent" or offset to either side of the barbed thread section 20, presenting a "bent" barb face as seen in FIG. 5. With the trailing edge 26 "bent" to one side, the ability of the screw with barbed threads 10 to resist backing out of a work piece is increased.

The barbed thread can be applied to numerous threaded fasteners, including screws, lag bolts, rail bolts, threaded hooks, threaded eye bolts, and other applications. The barbed thread is useful in metal as well as plastic fasteners, such as plastic wall anchors.

Figure 6:
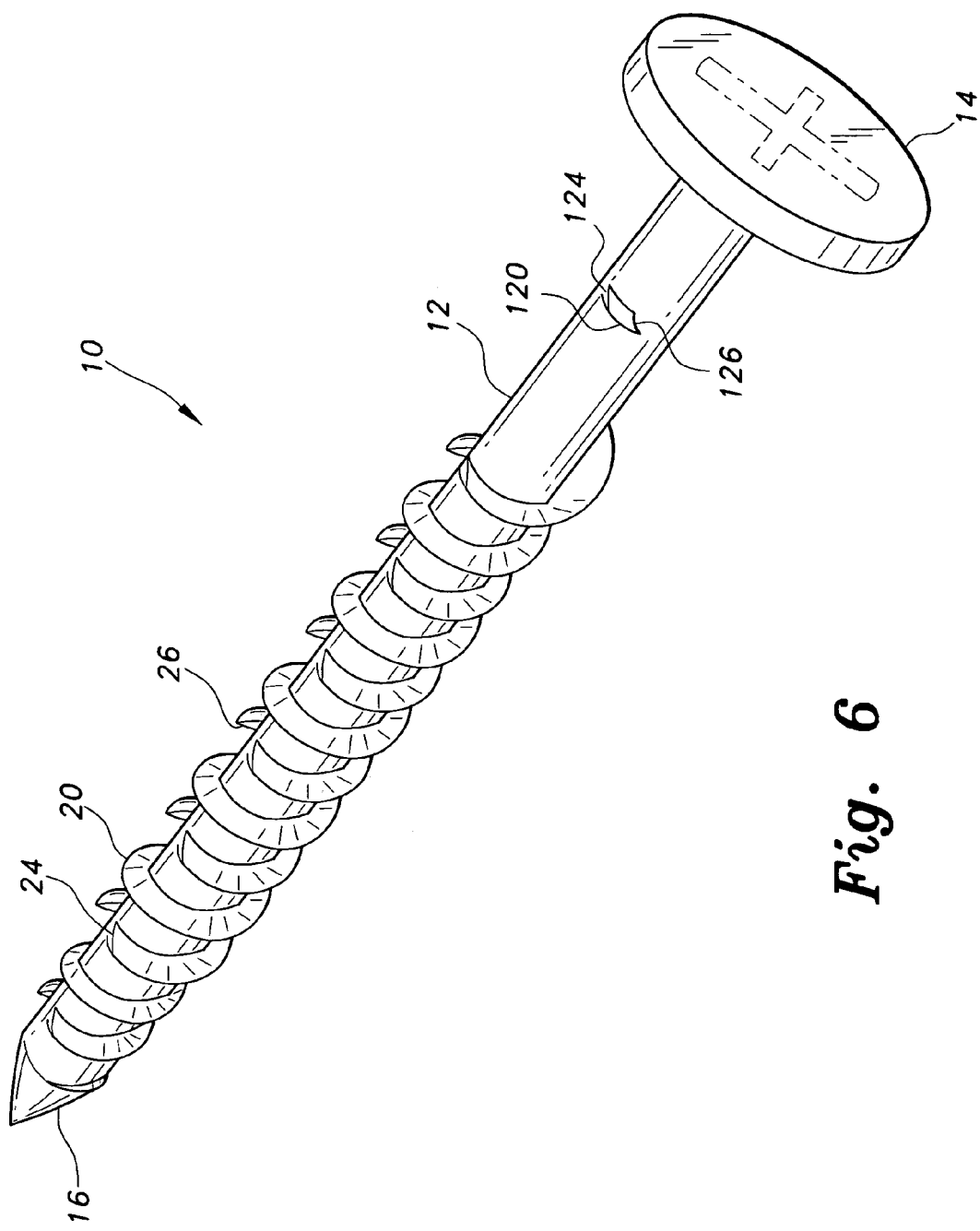
FIG. 6 is a perspective view of a screw with barbed threads similar to FIG. 1, with an additional small barb located on the unthreaded shank portion of the screw.

Referring to FIG. 6, a screw with barbed threads 10 is shown with an additional, short barb 120 formed along the unthreaded portion of the shank 12, wherein the short barb 120 is essentially a short length of thread defined by a leading edge 124 and a trailing edge 126. Any number, length, or size of short barbs 120 may be formed along the unthreaded portion of the shank 12. Addition of one or more short barbs 120 along the unthreaded portion of the shank 12 of the screw with barbed threads 10 increases the ability of the screw with barbed threads 10 to resist backing out of a workpiece.

Figure 7:
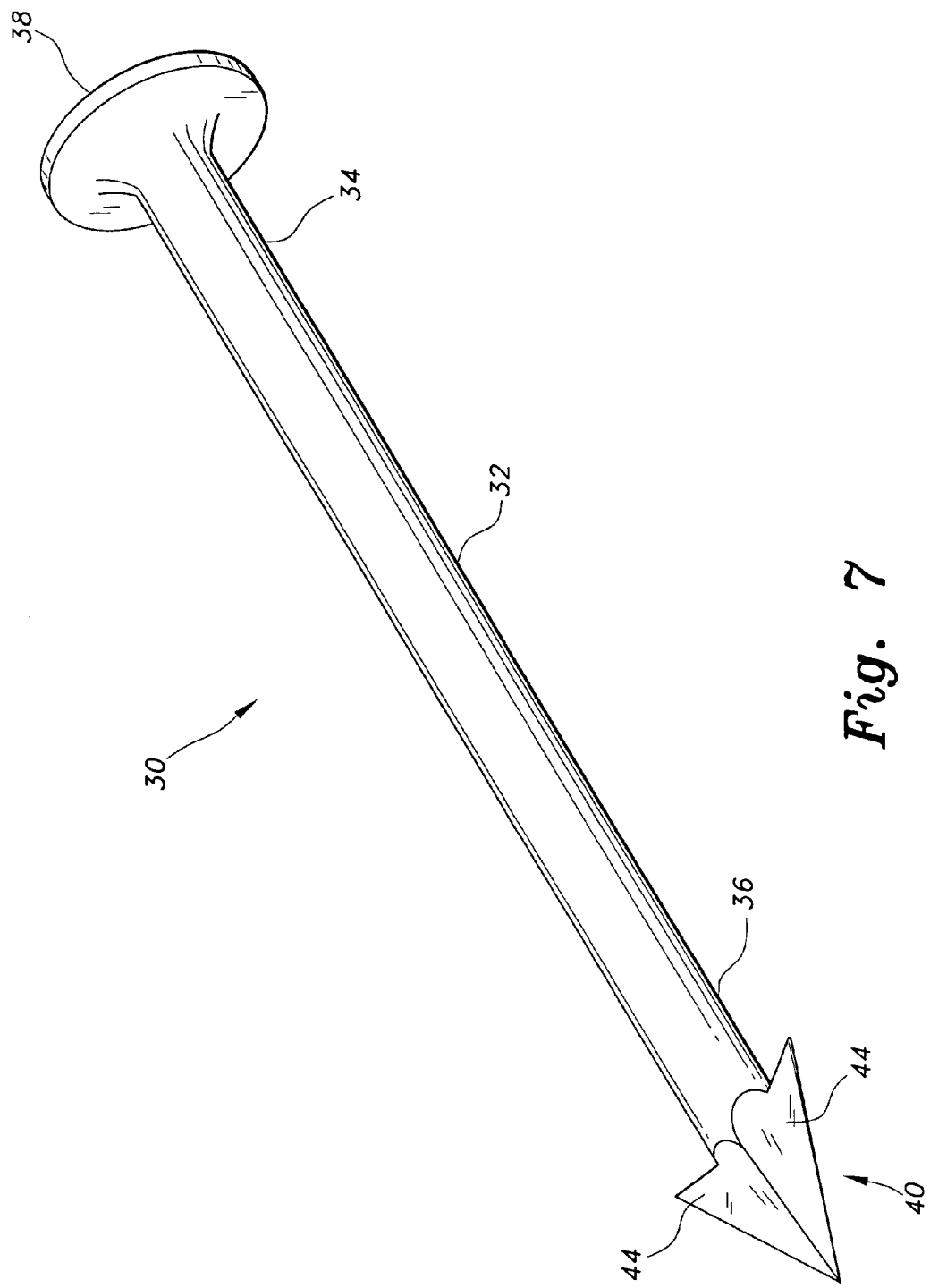
FIG. 7 is a perspective view of a nail with a barbed point as an embodiment of the reverse barb system for screws and nails according to the present invention.

Turning now to FIG. 7, the nail with a barbed point 30 is a nail generally in the form of conventional nails, having an elongated shank 32 with a head end 34 and a point end 36, the head end having a conventional nail head 38. However, instead of a conventional nail point formed at the point end 36, a barbed point 40 is formed.

Shown more clearly in FIG. 8, the barbed point 40 has at least one, and preferably two, barbs 44. Each barb 44 is defined by a leading edge 46, extending rearward from a point 42 at the point end 36 of the shank 32, and a trailing edge 48, extending from the leading edge 46 to the shank 32. A sharp barb point is formed at the intersection of the leading edge 46 and the trailing edge 48. The trailing edge 48 forms an angle $\alpha_n$ between the trailing edge 46 and the shank 32. Angle $\alpha_n$ is an acute angle of less than 90°. The angle should be greater than about 50°, and is preferably within a range of approximately 55° to 70°. An angle of approximately 60° appears to provide the maximum resistance to backing out of the nail with a barbed point 30.

The leading edges 46 are canted slightly to define a slight twist to the barbs, best seen in FIG. 10, to provide a rotational tendency as the nail with a barbed point 30 is driven. As shown in FIG. 9, the leading edge cant is described by a dihedral angle $\beta_n$ that is preferably between 2° and 4°. It is desired that the nail with a barbed point 30 rotate less than a full rotation as it is driven.

It is to be understood that the present invention is not limited to the embodiments described above, but encompasses any and all embodiments within the scope of the following claims.

I claim:

1. A screw with barbed threads, comprising:
   a shank having a head end and a point end;
   a plurality of barbed thread sections formed on the outer periphery of said shank, each barbed thread section having a leading edge and a trailing edge, the trailing edge defining a planar surface that extends from said shank, said planar surface forming an acute angle with a line tangent to said shank and extending normally from where the trailing edge meets said shank; the leading edge gradually tapering to meet the shank generally tangentially; and
   a head formed on the head end of said shank.

2. The screw with barbed threads according to claim 1, wherein said acute angle is between about 60° and about 70°.

3. The screw with barbed threads according to claim 2, wherein said acute angle is about 60°.

4. The screw with barbed threads according to claim 1, wherein said trailing edge is bent to one side of said barbed thread section.

5. A screw with barbed threads, comprising:
   a shank having a head end and a point end, said shank defining an outer substantially cylindrical periphery between said head end and said point end;
   a plurality of barbed thread sections formed on said outer periphery of said shank, each one of said plurality of barbed thread sections having a leading end and a trailing end, said trailing end defining a planar surface that extends from said shank, said planar surface being disposed at an acute angle with a line tangent to said shank and extending normally from where said trailing end meets said shank; and said leading end gradually tapering to meet said shank generally tangentially;
   wherein said acute angle is between about 60° and about 70°; and
   a head formed on said head end of said shank.

6. A screw with barbed threads, comprising:
   a shank having a head end and a point end, said shank defining an outer substantially cylindrical periphery between said head end and said point end;
   a plurality of barbed thread sections formed on said outer periphery of said shank, each one of said plurality of barbed thread sections having a leading end and a trailing end, said trailing end defining a planar surface that extends from said shank, said planar surface being disposed at an acute angle with a line tangent to said shank and extending normally from where said trailing end meets said shank, and said trailing edge being bent to one side of said barbed thread section, and said leading end gradually tapering to meet said shank generally tangentially;
   wherein said acute angle is between about 60° and about 70°; and
   a head formed on said head end of said shank.

* * * * *